United States Patent [19]

Meredith et al.

[11] Patent Number: 4,996,758
[45] Date of Patent: Mar. 5, 1991

[54] METHOD AND APPARATUS FOR SPUR AND HELICAL GEAR MANUFACTURE

[75] Inventors: Gary E. Meredith, Jersey Shore; Walter C. Wool, Williamsport, both of Pa.

[73] Assignee: Avco Corporation, Providence, R.I.

[21] Appl. No.: 517,561

[22] Filed: Apr. 30, 1990

[51] Int. Cl.$^5$ ................................................ B23P 6/00
[52] U.S. Cl. ........................................ 29/407; 51/290; 82/1.11; 279/1 G; 279/1 SJ; 279/123; 409/133
[58] Field of Search ............... 409/61, 133; 33/501.7, 33/501.15, 501.9; 73/162; 51/290; 82/1.11; 29/407; 279/1 G, 1 SJ, 123

[56] References Cited

U.S. PATENT DOCUMENTS

| | | | |
|---|---|---|---|
| 2,535,199 | 12/1950 | Day | 279/1 G |
| 2,793,042 | 5/1957 | Candee et al. | 279/1 G |
| 3,041,079 | 6/1962 | Garrison et al. | 279/1 G |
| 4,706,973 | 11/1987 | Covarrubias et al. | 279/1 SJ |

Primary Examiner—Steven C. Bishop
Attorney, Agent, or Firm—Perman & Green

[57] ABSTRACT

A method is described for assuring concentricity of a gear's pitch circle with its axis, the pitch circle having a non-constant radius about the axis. The method comprises the steps of: determining the gear's pitch circle and its position of maximum radial offset from the gears axis; positioning the gear in a chuck having a plurality of simultaneously movable jaws, the chuck having an axis which is continually concentric with respect to its jaws as they move, the position of maximum radial offset being positioned adjacent a chuck jaw so that when the jaws are moved to grip the gear, the axis of the gear is offset from the chuck axis by action of the jaws on the gear; placing the chuck and gripped gear in a machine tool adapted to machine the gear concentrically with the chuck's axis; and operating the machine tool to remove sufficient material from the gripped gear to bring the gear's axis into concentricity with the gear's pitch circle.

7 Claims, 2 Drawing Sheets

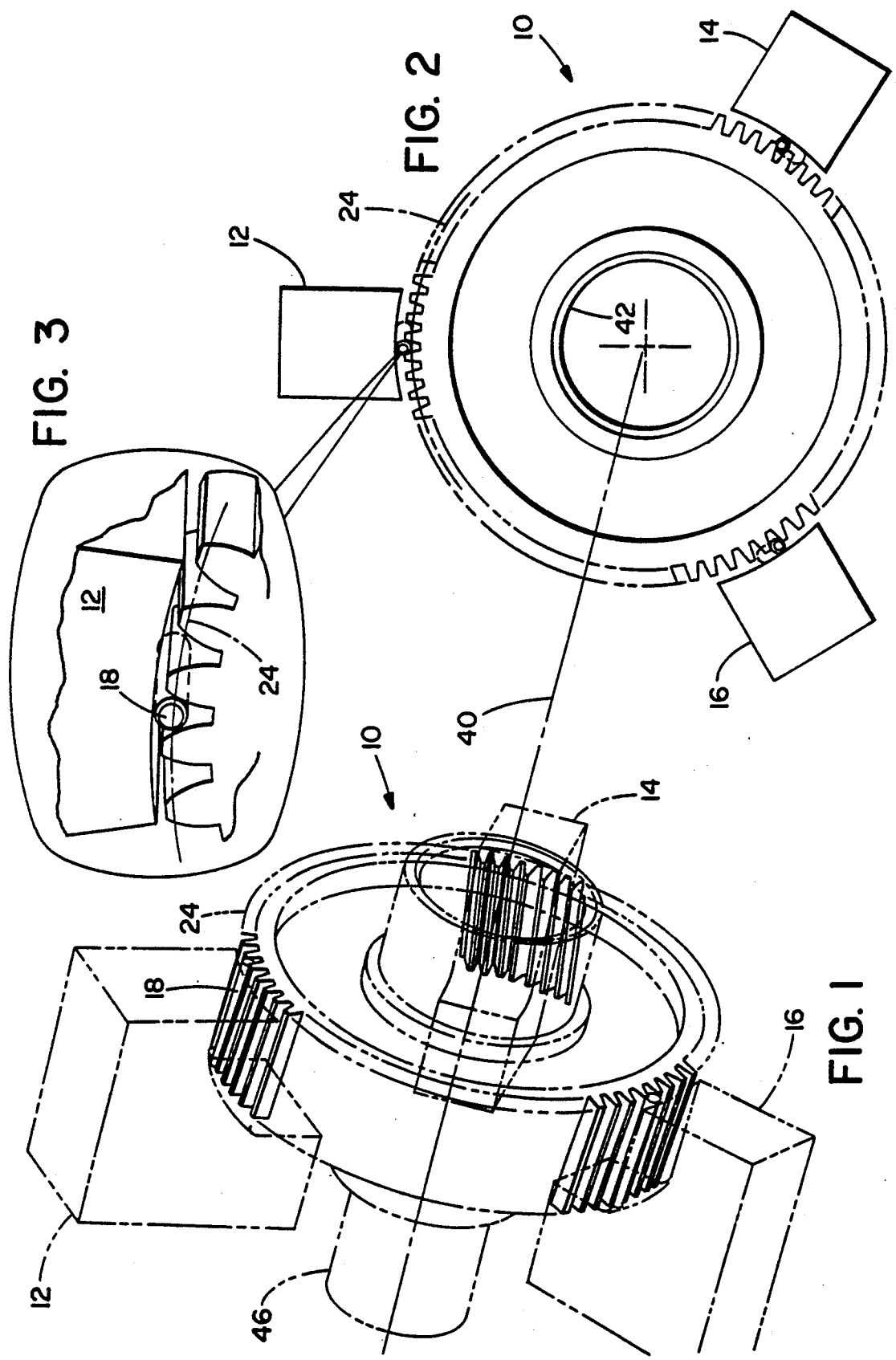

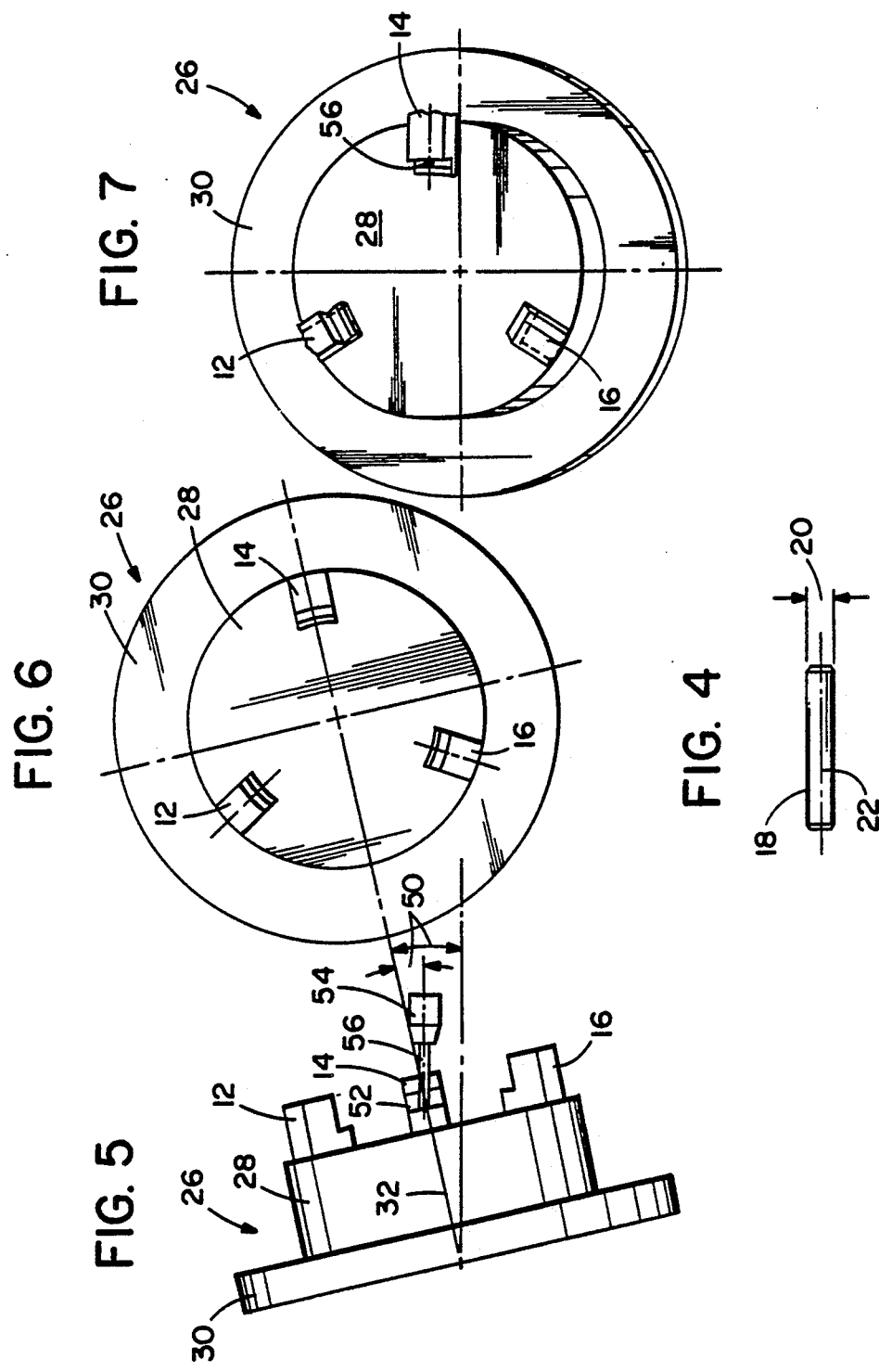

METHOD AND APPARATUS FOR SPUR AND HELICAL GEAR MANUFACTURE

FIELD OF THE INVENTION

This invention relates to a method and apparatus for the manufacture of helical and spur gears, and more particularly, to a method and apparatus for assuring that the gear's axis is concentrically located with respect to the gear's pitch circle.

BACKGROUND OF THE INVENTION

During manufacture of spur and helical gears, a gear's pitch circle may become non-concentrically located with respect to the gear's axis of rotation. This can result from an accumulation of machining tolerances during manufacture, or simply, the result of wear from continued use of the gear production apparatus. Such misalignment causes, at best, "noisier" gear function and, at worst, a gear which will fail much earlier than its anticipated lifetime.

Apparatus exists to detect and plot the relationship of a gear's pitch circle to its axis, e.g., see U.S. Pat. Nos. 4,610,091 and 4,646,443 of Bertz et al. and Hoffler. In both of those patents, an automatic test apparatus is described which determines circumferential spacing of gear teeth, deviations in tooth thickness, tooth gaps, and gear concentricity. In U.S. Pat. No. 3,522,524 of Smith et al., an apparatus is described for determining the pitch of succeeding gear teeth.

These references, while enabling the concentricity of a pitch circle to a gear's axis to be determined, do not suggest what should be done if the pitch circle is found to be non-concentrically located relative to a gear's axis. Under most production circumstances, gears found not adhering to manufacturing tolerances are either scrapped or sent back for rework, if the tolerance variations are modest. In either event, significant expense is added to the cost of the gear's manufacture.

Accordingly, it is an object of this invention to provide a method and apparatus for adjusting, during manufacture, the axis of a spur or helical gear so that it is concentric with the gear's pitch circle.

It is another object of this invention to provide a gear-holding chuck which is particularly adapted to hold helical gears during pitch circle/axis adjustment.

SUMMARY OF THE INVENTION

A method is described for assuring concentricity of a gear's pitch circle with its axis, the pitch circle having a non-constant radius about the axis. The method comprises the steps of: determining the gear's pitch circle and its position of maximum radial offset from the gear's axis; positioning the gear in a chuck having a plurality of simultaneously movable jaws, the chuck having an axis which is continually concentric with respect to its jaws as they move, the position of maximum radial offset being positioned adjacent a chuck jaw so that when the jaws are moved to grip the gear, the axis of the gear is offset from the chuck axis by action of the jaws on the gear; placing the chuck and gripped gear in a machine tool adapted to machine the gear concentrically with the chuck's axis; and operating the machine tool to remove sufficient material from the gripped gear to bring the gear's axis into concentricity with the gear's pitch circle.

DESCRIPTION OF THE DRAWINGS

FIG. 1 is a perspective view of a helical gear held by three jaws of a chuck.

FIG. 2 is a frontal view of the gear/chuck arrangement of FIG. 1.

FIG. 3 is an expanded view showing the interaction between the gear's teeth, a measuring roll and a chuck jaw.

FIG. 4 is a side view of the measuring roll shown in FIG. 3.

FIG. 5 is a side view of the gear holding chuck used with this invention.

FIG. 6 is a plan view of the gear holding chuck of FIG. 5 taken along a center line perpendicular to FIG. 5.

FIG. 7 is a plan view of the gear chuck of FIG. 5 taken along a centerline which is skewed at the helical gear angle.

DETAILED DESCRIPTION OF THE INVENTION

Referring now to FIGS. 1, 2 and 3, helical gear 10 is held in place by movable chuck jaws 12, 14, and 16. Interposed between each of the chuck jaws and gear 10 is a measuring roll 18. A side view of measuring roll 18 is shown in FIG. 4. The diameter 20 of measuring roll 18 may be chosen so that when it is placed between adjacent gear teeth, the centerline 22 of measuring roll 18 is coincident with the gear's pitch circle 24. Diameter 20 may also be chosen so that when measuring roll 18 is between adjacent gear teeth, it's centerline 22 is offset from pitch circle 24 by a known amount. Of course, all measuring rolls 18 should be identical in size to assure proper gear positioning.

As shown in FIGS. 5-7, gear chuck 26 comprises a plurality of movable jaws 12, 14, and 16 which are mounted on a movement mechanism 28 which is, in turn, mounted on base plate 30. Each of jaws 12, 14, and 16, when moved either inwardly or outwardly from centerline 32 of chuck 26, are continually concentric with respect thereto in the well-known manner. Such chucks are commercially available and, for example, may be obtained from: Buck Chuck Co., Kalamazoo, Mich.

If chuck 26 is to be employed for centering spur gears, no special machining is required for jaws 12, 14, and 16. On the other hand, if a helical gear is to be gripped by jaws 12, 14, and 16, a special machining step must be accomplished and will be described below.

Prior to a gear being placed in chuck 26, the pitch circle 24 of its gear teeth must be determined. This can be accomplished on a commercially available concentricity pitch circle checker having a graph-readout provision so that the radial offset of the pitch circle can be visualized in relation to the axis 40 of gear 10. Once the position of maximum radial offset of pitch circle 24 is known, gear 10 is rotated so that point is directly beneath one of jaws 12, 14, or 16. Jaws 12, 14, and 16 are then moved towards the periphery of gear 10 and measuring rolls 18 are emplaced between adjacent gear teeth beneath each jaw. The jaws are then tightened down onto measuring roller 18 to grip gear 10.

As can be seen from FIG. 3, when jaw 12 is tightened down, it does not actually touch the extremities of the gear teeth, but rather only contacts the circumference of measuring roll 18. As a result of this action by each of jaws 12, 14, and 16 upon measuring rolls 18, the centerline of the offset pitch circle 24 is moved so that it is concentrically positioned between each of the gripping jaws. The action of jaws 12, 14, and 16 assures that pitch circle 24 is concentric to centerline 32 of chuck 26 and further assures that any non-concentricity is transferred to shaftway 42 through the action of measuring rolls 18. The result of this action is that axis 40 of gear 10 is offset from axis 32 of chuck 26 by the amount of radial non-concentricity of pitch circle 24.

Once gear 10 is gripped by chuck jaws 12, 14, and 16, base 30 of chuck 26 is secured to an internal grinder (not shown), so that centerline 32 of chuck 26 is precisely located on the centerline of the internal grinder. Subsequently, the grinder concentrically machines the internal surfaces of shaftway 42, thereby rendering it concentric with pitch circle 24.

If gear 10, instead of being provided with a shaftway 42 has an axle attached thereto (e.g. axle 46), the gear is acted upon similarly by jaws 12, 14, 16; however chuck base 30 is placed in a lathe and the outer surface of shaft 46 is accordingly machined to bring it into concentricity with pitch circle 24.

The above description mainly concerns the operation of the invention with respect to spur gears. When, however, a helical gear is to be operated upon, the gripping surfaces of each of chuck jaws 12, 14, and 16 must be machined to receive the measuring roll/helical gear arrangement.

This machining is illustrated in FIGS. 5-7. Prior to a helical gear being put in place within chuck jaws 12, 14, and 16, chuck base 30 is secured to a rotary angle table (not shown) and the table is tilted at an angle 50 which is equal to the helix angle of the teeth of the helical gear to be gripped. Each inner surface 52 of each chuck jaw is then finish machined by a rotary grinder 54 whose angular orientation with respect to chuck 26 is exactly the same as helix angle 50. Grinding bit 56 (shown in FIGS. 5 and 7) thereby removes material from the distal and proximal areas of chuck jaw inner surfaces 52. This action enables a subsequently emplaced measuring roll 18 to be in contact with the entire inner surface 52 of each jaw of chuck 26.

Without such finish machining, measuring roll 18 would bridge between the distal and proximal edges of surface 52 and distort, thereby potentially distorting the subsequent operations on gear 10. Once inner surfaces 52 of jaws 12, 14, and 16 have been appropriately machined, each can receive and grip a helical gear/measuring roll combination and appropriately center the pitch circle of the gear so that its shaftway or shaft can be operated upon by a subsequent machining operation.

As a result of the above-described invention, a spur or helical gear whose shaftway/shaft are out of round with the gears pitch circle may be further machined to precisely center the gear's axis of rotation with its pitch circle.

It should be understood that the foregoing description is only illustrative of the invention. Various alternatives and modifications can be devised by those skilled in the art without departing from the invention. Accordingly, the present invention is intended to embrace all such alternatives, modifications and variances which fall within the scope of the appended claims.

We claim:

1. A method for assuring concentricity of a gear's pitch circle with the gear's axis, said method comprising the steps of:

determining said pitch circle for said gear and a position of any maximum radial offset of said pitch circle from said gear's axis;

positioning said gear in a chuck having a plurality of movable jaws, said chuck having an axis which is concentric with respect to said jaws as they move, said position of maximum radial offset of said pitch circle being positioned adjacent a chuck jaw, so that when said jaws are moved to grip said gear, the axis of said gear is offset from said chuck axis by action of said jaws on said gear;

placing said chuck and gripped gear in a machine tool adapted to machine said gripped gear concentrically with said chuck axis; and operating said machine tool to remove sufficient material from said gripped gear to bring said gear axis into concentricity with said gear's pitch circle.

2. The method as defined in claim 1 wherein said positioning step includes the further step of:

disposing a measuring roll between adjacent gear teeth at said position of maximum radial offset of said pitch circle and additional measuring rolls between adjacent gear teeth underlying other chuck jaws.

3. The method as defined in claim 2 wherein each said measuring roll has a diameter which enables its centerline to be coincident with said pitch circle circumference when each said measuring roll lies between and is in simultaneous contact with adjacent gear teeth.

4. The method as defined in claim 2 wherein said gear is provided with a shaftway and said machine tool is a concentric boring grinder, said boring grinder removing material from said shaftway to render said shaftway concentric with said gear's pitch circle.

5. The method as defined in claim 2 wherein said gear is provided with a shaft, and said machine tool is a lathe, said lathe removing material from said shaft so as to render its surface concentric with said gear's pitch circle.

6. The method as defined in claim 2 wherein said gear is a helical gear, each gear tooth of said gear exhibiting a helix angle with respect to an axis of rotation of said gear and each of the jaws of said chuck pre-machined to said helix angle of said gear, whereby measuring rolls disposed between said gear teeth and said pre-machined chuck jaws will contact said pre-machined surface along the length of each said measuring roll.

7. A chuck having a centrally located axis and adapted to hold a helical gear such that said gear's pitch circle is concentric with said axis of said chuck, the combination comprising:
- a plurality of simultaneously movable chuck jaws, each said chuck jaw having a concave gripping surface whose shape is complementary to the external shape of said helical gear, said gripping surface machined to a concave shape which matches the helix angle gear teeth of said gear;
- a measuring roll positioned between adjacent gear teeth beneath each jaw of said chuck, each said measuring roll having a diameter such that its centerline is coincident with said gear's pitch circle when each said measuring roll is positioned between and is simultaneously in contact with said adjacent gear teeth, whereby said measuring rolls are contacted along their entire length when said chuck jaws are moved into gripping contact therewith.

* * * * *